Dec. 2, 1958 A. W. BLOW ET AL 2,863,073

REMOTE SUPERVISORY CONTROL SYSTEM

Filed July 26, 1957 4 Sheets-Sheet 1

INVENTORS,
ANGUS W. BLOW
ADOLPH A. BAKER
GEORGE H. CLARK

BY R. G. Stahr

ATTORNEY 2,863,073

REMOTE SUPERVISORY CONTROL SYSTEM

Angus W. Blow, Adolph A. Baker, and George H. Clark, Rochester, N. Y., assignors to General Dynamics Corporation, Rochester, N. Y., a corporation of Delaware Application July 26, 1957, Serial No. 674,452

20 Claims. (Cl. 307—140)

Figure 2:
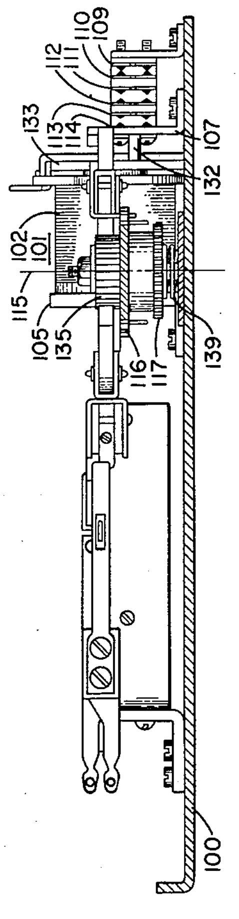

This invention relates to remote supervisory control systems and, more specifically, to a system wherein remote control is effected on a time interval basis.

In general, remote control systems of the prior art operate on a tone basis. That is, each control function is assigned a particular tone or, more specifically, a signal impulse of a particular frequency. These control frequencies are generated at the controlling station by any suitable signal source and are selectively transmitted to the controlled station through a system of selector switches. The controlled station is provided with a series of wave filters, one for each different signal frequency or tone, which separate the incoming signals and direct the different signals to respective local control devices. Because each control function is assigned a specific signal frequency and each control device has an associated wave filter tuned to the frequency of the signal which has been assigned to operate this device, in this type system a plurality of control functions may be transmitted simultaneously from the controlling to the controlled station.

It is apparent, therefore, that, with systems in which a large number of control functions must be transmitted, to assign a separate signal frequency to each function results in a wide signal frequency band. This requires transmission facilities which will adequately transmit this band width. As the number of control functions transmitted increases, therefore, the problem involved in providing adequate transmission facilities are compounded. In applications in which the expense of wide band transmission facilities is unwarranted or in applications in which existing equipment which is inadequate for wide band transmission must be used, the use of tone basis remote control systems would be impractical or even impossible.

Tone basis remote control systems have been generally subject to the objections of expensive transmission facilities, with systems in which a large number of control functions are required, or the compromise of the control system to the available facilities in applications in which existing equipment, which is inadequate to facilitate wide band transmission, must be used.

It is, accordingly, an object of this invention to provide a remote control supervisory system which will obviate the disadvantages of the prior art.

It is another object of this invention to provide a remote control supervisory system having a narrow transmission band width.

It is another object of this invention to provide a remote control supervisory system in which the required transmission band width is independent of the number of functions to be transmitted.

It is another object of this invention to provide a remote control supervisory system in which a large number of control functions may be transmitted using a minimum number of different frequencies.

It is another object of this invention to provide a remote control supervisory system which transmits control function pulses on a time interval basis.

In accordance with this invention, a step switch is installed in each of the controlling and controlled stations. These step switches each contain a plurality of stationary contacts and movable contacts, the movable contacts of the respective step switches being interconnected and synchronized for simultaneous operation. To operate a series of working devices at the controlled station, a function signal is generated by a signal source at the controlling station. This source of function signals is connected to the stationary contacts of a step switch at the controlling station while the working devices are connected to corresponding stationary contacts of a step switch at the controlled station. In this manner, the controlled station working devices may be connected to, and operated by, the function signal originating at the controlled station through the corresponding stationary contacts of each step switch and the respective interconnected, synchronized movable contacts.

Figure 1:
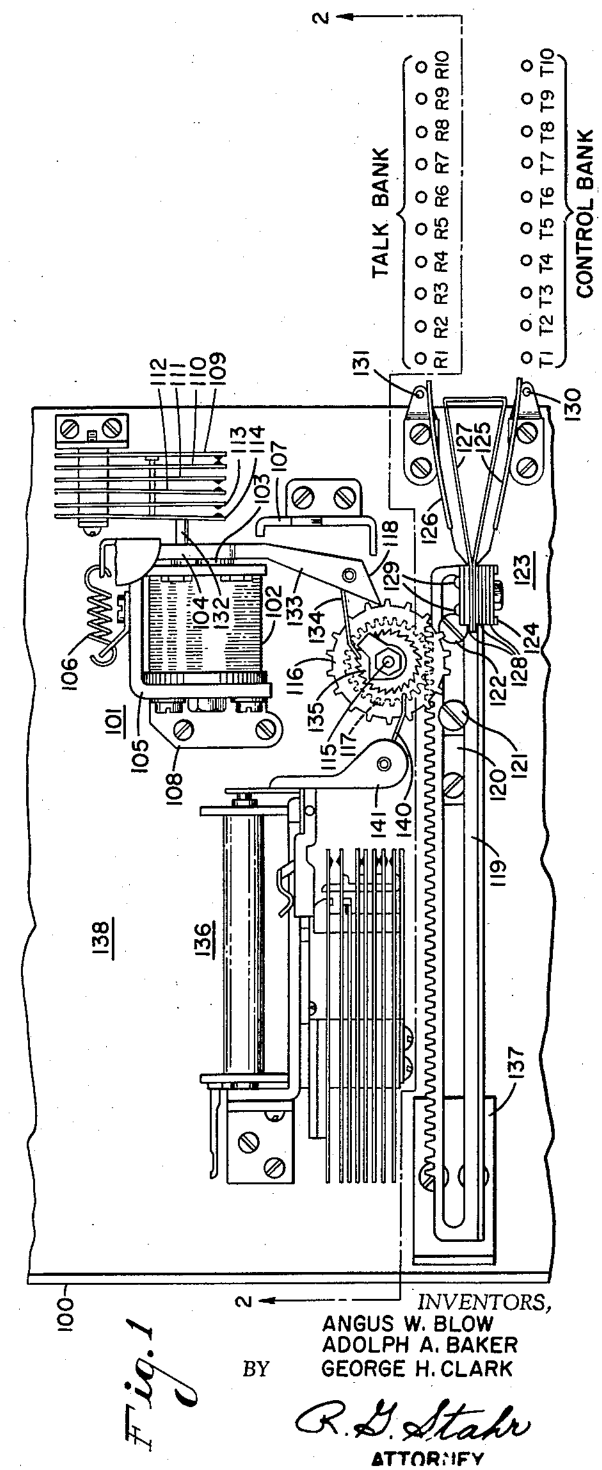
Figure 3:
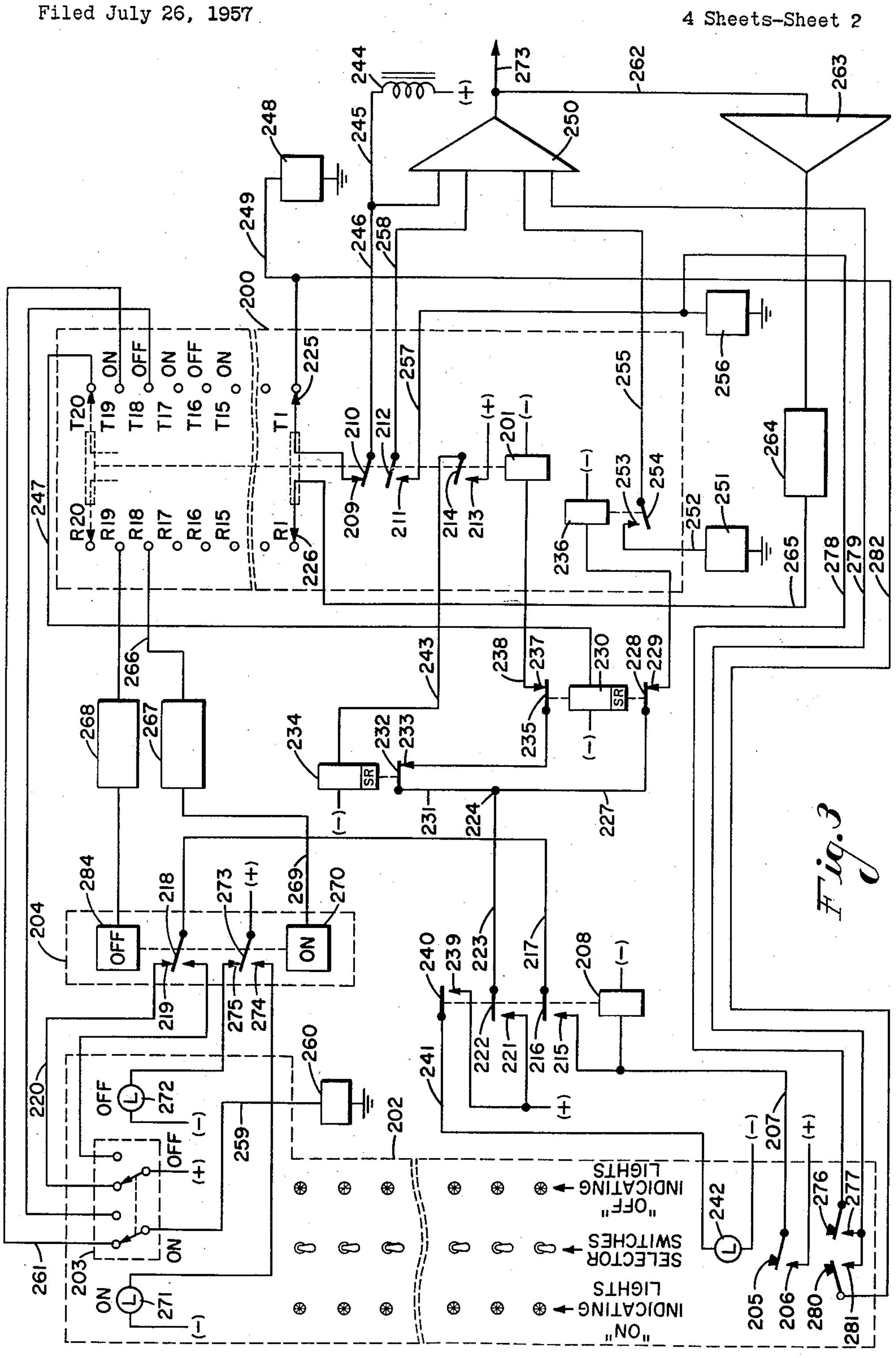
Figure 4:
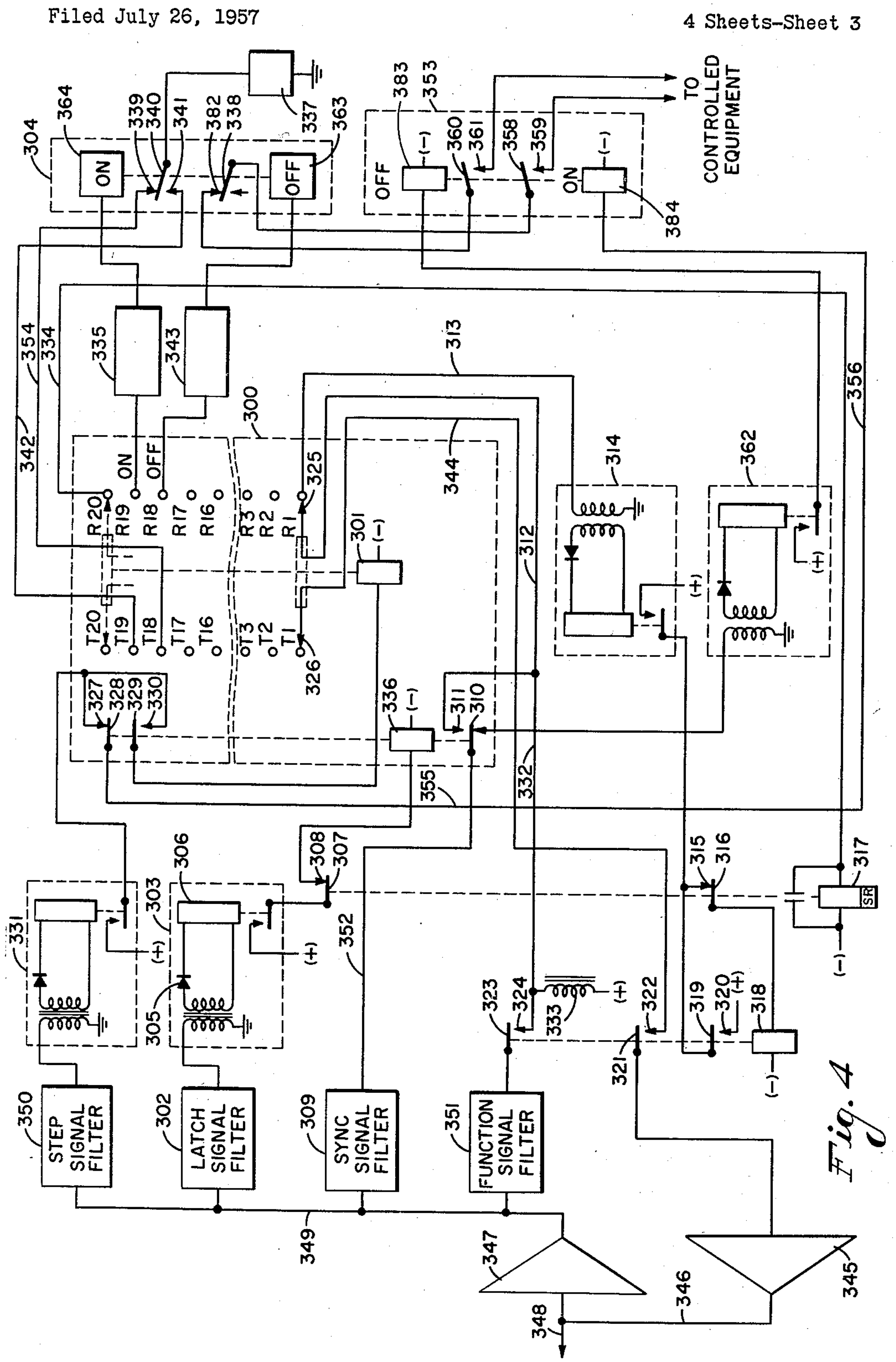
Figure 5:
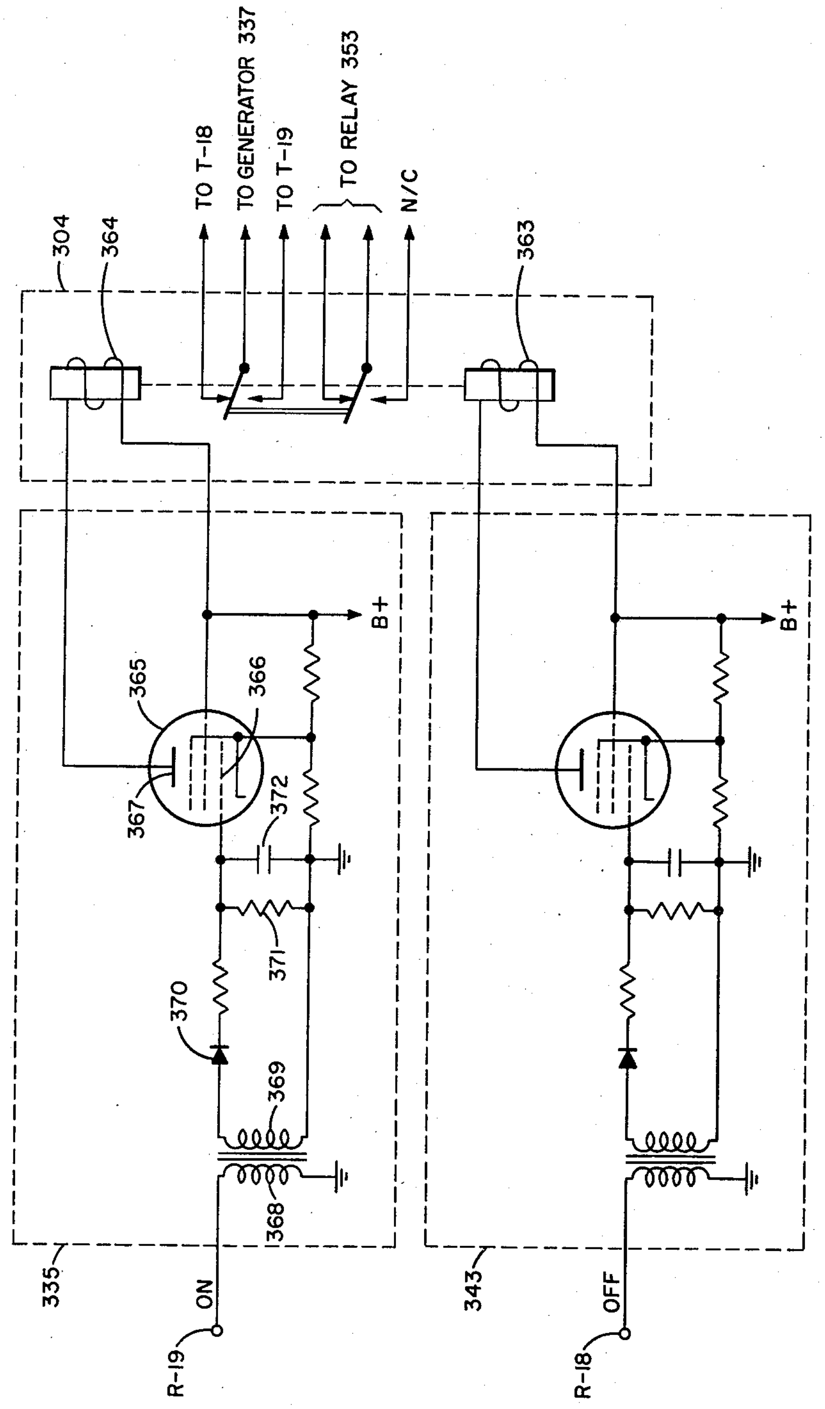

For a better understanding of the present invention, together with further objects, advantages and features thereof, reference is made to the following description and accompanying drawings, in which:

Figure 1 of the drawings is a plan view of one of the step switches which may be used in carrying out this invention, Figure 2 is a section view taken along line 2—2 of Figure 1, Figure 3 is a schematic circuit diagram of the transmitter circuit of this invention, Figure 4 is a schematic circuit diagram of the receiver circuit of this invention, and Figure 5 is a schematic circuit of the delay networks which may be used in this invention.

While the present description is in reference to an application of this invention for remotely controlling a plurality of "on-off" functions at a controlled station from a controlling station through the transmission of function pulses over a standard narrow band, two conductor, 600 ohm telephone line, it is to be understood that the principles of this invention may be used with any system in which remote control from a controlling station is desirable.

Figures 1 and 2 are plan and section views, respectively, of a step switch which may be used with this invention. As this unit is an essential part of both the transmitter and receiver circuits, it will be described in detail although, per se, it forms no part of this invention having been previously disclosed in a prior application, Serial Number 394,413, filed November 25, 1953, for a Telephone System, in the name of Mr. Angus W. Blow et al.

As is indicated in Figures 1 and 2, there is mounted on plate 100 a step relay 101 having a winding 102 around a core of which only pole face 103 is visible. Step relay 101 is equipped with an armature 104 and a yoke 105. The armature is here indicated in its energized position, but when deenergized it is biased to its open position by spring 106. Stop 107 may be used to prevent armature 104 from becoming displaced too far from pole face 103. The magnet may be supported in any suitable fashion, as by bracket 108. Contact springs 109, 110, 111, 112, 113, and 114 are actuated by armature 104 through any suitable medium, such as insulating actuating rod 132. It should be noted at this time, that relay 101 has associated therewith two pairs of normally open contacts and one pair of normally closed contacts.

The outer end 133, of armature 104, carries pusher pawl arm 134. Pawl arm 134 engages ratchet gear 135 around its central axis 115. Attached for rotation around axis 115 with ratchet gear 135 are sprocket 116 and drive gear 117. A protruding portion 118 of end 133 of armature 104 is arranged to engage the teeth of sprocket 116 when in the actuated position of step relay 101 for the purpose of preventing pawl arm 134 from rotating ratchet 135 more than one step.

As drive gear 117 is rotated through the medium of the successive operation of relay 101, it drives rack 119 in a linear direction. Rack 119 may be kept on its linear course by cutout portion or slot 120, the edges of which surround suitable guiding means, such as screws 121 and 122.

Rack 119 carries contact spring assembly 123, thereby providing movable contacts. Assembly 123 comprises a mounting bracket 124, movable contact springs 125 and 126, travel restrainer 127, insulators 128 and rivets 129 which may be used to secure contact springs 125 and 126, together with travel restrainer and contact protector 127, to bracket 124.

Movable contact springs 125 and 126 are indicated in the reset, or "home," position where they are restrained from divergent movement by means of stops 130 and 131, respectively. As rack 119 is driven linearly outward from its "home" position through the successive pulsing of step relay 101, springs 125 and 126 are arranged to successively brush the stationary contacts indicated as small circles marked R1 through R10 and T1 through T10, respectively. For the purpose of conserving space, only ten stationary contacts for each contact spring have been indicated in these drawings; however, as many stationary contacts may be provided as the linear movement of rack 119 will accommodate.

Step relay 101 is energized by current pulses, therefore, to successively step or drive rack 119, successive energizing pulses must be applied to step relay 101.

Restoring force for rack 119 is provided by spring 139 which engages the unitary assembly of ratchet 135, sprocket 116 and drive gear 117 at its upper end and mounting 100 at its lower end. Spring 139 would normally cause contacts 125 and 126 to restore, i. e., return to the home position at the conclusion of each stepping pulse, the restoring force being transmitted to rack 119 by drive gear 117. Consequently, a latch relay is provided for preventing this restoration or return until a connection established through contact springs 125 and 126 is no longer required.

To provide a restraining linkage for rack 119, a restraining pawl arm 140 which is carried by armature 141 of latch relay 136 is employed. Arm 140 positively engages a tooth of ratchet 135 whenever latch relay 136 is energized. According to our invention, latch relay 136 is arranged to be energized until contact springs 125 and 126 have completed their linear travel and have reached the last fixed contact. At this time, latch release relay is energized, releasing the restraining linkage, thus permitting the movable contacts to be restored to their home position through the medium of spring 139.

Through the use of this switch, therefore, it is apparent that contact between contact springs 125 and 126 and the next successive stationary contact is effected through the successive pulsing of stepping relay 101, holding the movable contacts in their last position through the medium of a latch relay and de-energizing the latch relay at the conclusion of the movable contacts linear travel.

Figures 3 and 4 of the drawings illustrate schematically the transmitter and receiver circuits of this invention, respectively. A number of the elements in each circuit combination may be units of equipment which are old and well known in their particular art. Therefore, the selection of any particuflar unit from its class, in general, to be applied as one of these elements in these circuit combinations is largely discretionary as practically all units of the class may be substituted satisfactorily. As these elements, per se, form no part of this invention, but are referred to only for purposes of identification, they will not be described in detail in the specification and are illustrated in Figures 3 and 4 in block form in the interest of space conservation. Reference numerals 250 and 263 of Figure 3 and 345 and 347 of Figure 4 identify the block representations of conventional amplifier units while reference numerals 248, 251, 256 and 260 of Figure 3 and reference numeral 337 of Figure 4 identify the block representations of conventional signal generators. Wave filter networks of any suitable design are also indicated in block form and identified by reference numerals 264 in Figure 3 and 302, 309, 350 and 351 in Figure 4. A two-conductor, narrow band, 600 ohm telephone line interconnecting the controlling and controlled stations is identified at the transmitter end by reference numeral 273, Figure 3, and at the receiver end by reference numeral 348, Figure 4.

While other elements of the circuit combination are units which are also old and well known in the art, they have been detailed in Figures 3 and 4 to facilitate the circuit description. These units are indicated by reference numerals 200, 203 and 204 in Figure 3 and by reference numerals 300 and 304 in Figure 4, in addition to being enclosed in dotted lines. The step switch units which may be used are identified by reference numerals 200 and 300 in Figures 3 and 4, respectively, and have been described in detail hereinabove. The other elements of this group will be explained in detail, along with the circuit description, later in the specification.

Figure 3 illustrates the transmitter circuit of this invention and consists of a step switch 200, as described above, the associated relays, amplifier 250 and 263, signal generators 248, 251, 256 and 260, wave filter 264, and a control panel 202. The control panel 202 consists of a series of selector switches, one for each device to be remotely controlled, for the purpose of selecting either an "on" or "off" function, the associated indicating lights, alarm indicator light 242 and transmit buttons 205, 276 and 280. The selector switches may be of any double-pole, double-throw, maintained contact design as is schematically illustrated at 203. Associated with each switch is an "on" indicating light and an "off" indicating light for positively indicating the condition of the controlled device. Also associated with each selector switch, in accordance with this invention, is an auxiliary mechanical latch relay indicated at 204. This relay may be of any design, the requirement being only that the movable contacts remain in their last energized position and must be positively actuated to the other position through the energization of either the "on" coil 270 or the "off" coil 284, as the case may be. For the purpose of conserving space, the detailed wiring of only one selector switch, its associated "on-off" indicating lights and auxiliary latching relay has been indicated. It is to be understood that a series of these switches and their associated equipment may be used, one for each device to be remotely controlled, and each similarly connected to respective "on" contacts and "off" contacts of the step switch 200 for selectively connecting the function signal source 260 to the transmit stationary contacts. It should be noted also at this time that only one bank of stationary contacts of the step switch is utilized to transmit "on" or "off" functions to the controlled equipment while the other bank of stationary contacts is employed for the purpose of receiving confirming or supervisory information from the controlled devices in a manner to be explained later.

For purposes of illustrating the operation of this invention, one function will be traced through the transmitter circuit. Assuming a certain device is to be turned "on" at the receiving station, the "on" function is selected by the corresponding selector switch 203. After this function has been selected, momentary contact transmit button 205 is depressed, establishing a connection with its associated stationary contact 206. Upon the completion of this connection, battery is placed across control relay 208 through contacts 206, 205, and lead 207. This, of course, energizes relay 208 which closes the associated normally open contacts 215 and 216. As these contacts close, battery is also placed across relay 208 through the right arm of selector switch 203, lead 220, the closed contacts 218 and 219 of auxiliary relay 204, lead 217, and closed contacts 215 and 216 to relay 208. This latter circuit establishes a holding circuit for relay 208, thus preventing it from dropping out as the momentary contacts 205 and 206 of the transmit button are allowed to open.

As relay 208 energizes, its associated normally open contacts 221 and 222 are also closed. Through these contacts, battery is placed across both the step relay 201 and the latch relay 236 of step switch 200. This battery circuit may be traced through contacts 221 and 222, lead 223 to point 224. At this point the circuit divides, the step relay 201 circuit being completed from point 224 through lead 231, normally closed contacts 232 and 233 of step assist relay 234, the normally closed contacts 235 and 237 of release relay 230 and line 238 to relay 201. The latch relay 236 circuit may be traced from point 224 through lead 227, normally closed contacts 228 and 229 of release relay 230, to relay 236.

As step magnet 201 becomes energized, the associated normally open contacts 213 and 214 are closed. As these contacts are closed, battery is placed across step assist relay 234 through contacts 213, 214, and line 243.

As step assist relay 234 energizes, its associated normally closed contacts 232 and 233 are opened, removing battery from step relay 201. This, of course, de-energizes relay 201, which permits its associated normally closed contacts 213 and 214 to open, removing battery from step assist relay 234. As battery is removed from step assist relay 234, its associated normally closed contacts 232 and 233 again close, re-establishing battery on step relay 201. In this manner, it can readily be seen that step relay 201 is self-pulsed, thereby successively stepping movable contacts 225 and 226 outward from their home position. As the latch relay 236 remains energized during this operation, movable contacts 225 and 226 are prevented from returning to the home position by the associated restraining linkage, as previously described. Step assist relay 234 is indicated to be of the slow release type. By adjusting the operating and/or release time of this relay, the period of the step relay 201 pulses may be selected within certain limits.

At the end of the linear travel of movable contacts 225 and 226, movable contact 225 establishes a connection with stationary contact T20, which places battery across the release relay 230. This circuit may be traced through inductor 244, line 245, line 246, normally closed contacts 209 and 210 of step relay 201, through movable contact 225, stationary contact T20, line 247 to release relay 230. As release relay 230 is energized, its associated normally closed contacts 235 and 237 and 228 and 229 are opened, thereby removing battery from both step relay 201 and latch relay 236. As latch relay 236 is de-energized, the restraining linkage releases, allowing movable contacts 225 and 226 to return to their "home" position. Release relay 230 is a slow release relay, thereby maintaining its associated normally closed contacts open, after its battery circuit has been interrupted by movable contact 225 breaking contact with stationary contact T20, for a sufficiently long duration to permit movable contacts 225 and 226 to return to their home position before battery is re-established on step relay 201 and latch relay 236. This function could also be obtained by moving relay 230 lock in from a holding contact and then have holding circuit opened by contact 225 in home position. This stepping sequence and subsequent return of movable contacts 225 and 226 continues so long as battery is maintained on control relay 208 through its holding circuit as described before.

As the step relay which is located in the receiver must be simultaneously operated by and synchronized with the step switch at the transmitter, latching signals, stepping signals, and synchronizing signals must be originated in the transmitter and conveyed to the receiver. For this purpose, respective signal sources 251, 256 and 248, each characterized by a distinctive signal frequency, are provided.

When battery is placed across latch relay 236, as described before, its associated normally open contacts 253 and 254 are closed. This establishes a connection between latch signal source 251 and the amplifier 250 which can be traced through line 252, contacts 253 and 254, line 255 to amplifier 250, and hence, to interconnecting telephone line 273. At the controlled station, this signal operates the latch relay of the receiver step switch in a manner to be explained with the description of the receiver circuit.

To simultaneously operate the receiver step switch and the transmitter step switch, a step signal, which is originated in source 256, is transmitted to the receiver upon each operation of step relay 201. This circuit may be traced from source 256, line 257, contacts 211 and 212, line 258 to the amplifier 250 and interconnecting line 273. As contacts 211 and 212 are normally open contacts associated with step relay 201, they are closed only for those periods during which step relay 201 is energized. Therefore, the circuit to transmit a step signal from source 256 is established only during those periods that step relay 201 is energized. Because of this, the step signals are transmitted as pulses which operate the receiver step switch in a manner to be explained in connection with the receiver circuit description.

To operate the respective step switches in synchronism, it is obviously mandatory that the respective movable contacts of each switch be at the "home" position with the start of each stepping sequence. In accordance with this invention, to insure that the receiver step switch will not receive function signals unless this condition is met, thereby rendering the function signals ineffective, a synchronizing signal is originated by source 248. This signal is transmitted only when the movable contacts of the transmitter step switch 200 are at the "home" position and may be traced from source 248, line 249, contact T1, movable contact 225, contacts 209 and 210, line 246, amplifier 250 and line 273. This circuit is interrupted as movable contact 225 is stepped away from contact T1 and is not re-established until the movable contact returns to the "home" position. The effect of this signal will be detailed later with the receiver circuit description.

To operate the controlled devices at the receiver, "on" and "off" function signals must also be transmitted. All "on" and "off" function signals are of the same frequency and originate in function signal source 260. The function signals may be selectively connected to the stationary contacts of step switch 200, in accordance with this invention, by a series of selector switches similar to that shown at 203. Since we have assumed selector switch 203 to have been in the "on" position, the function signals may be traced from source 260, through line 259, selector switch 203, and line 261 to the corresponding "on" stationary contact T19 of step switch 200. As movable contact 225 is successively stepped past the stationary contacts of step switch 200, as has been previously described, it brushes stationary contact T19 and establishes a connection to the amplifier 250 and, hence, interconnecting line 273 through normally closed contacts 209 and 210 and line 246. Since the step switch at the receiver is operated in synchronism with the step switch at the transmitter, the movable contacts at the receiver simultaneously brushes the corresponding stationary contact of the receiver step switch. By connecting a working device at the controlled station to the corresponding stationary contact of the receiver step switch, the function signal is impressed thereon in a manner to be explained in detail later.

It should be noted, at this time, that the energization of control relay 208 also closes its associated pair of normally open contacts 239 and 240. The closure of these contacts establishes a connection from battery, contact 239, contact 240, line 241, across alarm light 242. Therefore, alarm light 242 will be illuminated for the entire period during which the transmitter is sending function signals. This alarm light affords a visual indication that the system is in operation.

As has been pointed out before, the transmitter step switch will continue to operate until battery is removed from control relay 208. To do this, a confirming or supervisory signal must be originated in the receiver equipment and transmitted back to the transmitter step switch stationary contact R18 in a manner to be described later. Therefore, discussion of the method of shutting down the control equipment will be reserved until after the operation of the receiver equipment has been described.

Referring now to Figure 4, which is the schematic circuit of the receiver equipment of this invention, it can be seen that the receiver is also equipped with a pair of conventional amplifiers indicated at 345 and 347 and a step relay 300. For each unit of equipment to be controlled, there is provided a working device indicated at 304. These devices may be mechanical latching relays, the movable contacts of which remain in their last energized position. To actuate the movable contacts to their alternate position, either the "on" coil 364 or the "off" coil 363 must be energized as the situation may require. In this invention, the "on" coils or "off" coils of the working devices are selectively energized by the function signals, which have been originated in the controlling station, in a manner to be now described.

Assuming that a latch signal has been transmitted from the controlling station in the manner as hereinbefore described, it is received over two-conductor telephone line 348 through conventional amplifier 347. From amplifier 347, the signal is impressed upon bus 349 and is separated by filter 302 which is tuned to the latch signal frequency. As filters 309, 350 and 351 are tuned to different frequencies, the latch signal is thereby rejected from their associated circuits. Upon passing through filter 302, the latch signal is impressed upon a latch relay control network 303. As the received latch signal is not of sufficient magnitude to operate latch relay 336, this control network is required for the purpose of establishing a local battery circuit which will provide sufficient power to operate latch relay 336. As is shown schematically, the latch signal is transformer connected through a rectifier 305 to a sensitive relay 306. As relay 306 is energized, its associated contacts close, thereby picking up a local battery circuit, as indicated. Local battery across latch relay 336 may be traced through the closed contacts of sensitive relay 306, normally closed contacts 307 and 308 of synchronizing control relay 317 to latch relay 316. Through the operation of this latching relay, the movable contacts of step switch 300 are restrained from returning to their "home" position as the switch is subsequently stepped, in a manner as has hereinbefore been described.

The synchronizing signal, which has been originated in the controlling station, is also impressed upon bus 349 through two-conductor telephone line 348 and conventional amplifier 347. This signal is separated by filter 309, which is tuned to its frequency, and is rejected by filters 302, 350, and 351. The synchronizing signal is impressed upon movable contact 325 of step switch 300 through line 352, the contacts 310 and 311 of latch relay 336, which are now closed in that latch relay 336 has been energized by the receipt of a latch signal, and through line 312 to movable contact 325 which is resting on the "home" position stationary contact R1 of step switch 300. From R1, the synchronizing signal is further transmitted through line 313 through synchronizing relay control network 314, which operates in the same manner and for the same reason as described before in connection with latch relay control network 303, through normally closed contacts 315 and 316 of synchronizing control relay 317 to synchronizing relay 318. As synchronizing relay 318 is energized, its associated normally open contacts 319 and 320 are closed, which establishes a connection from battery through the closed contacts 319 and 320 of the synchronizing relay, and through the normally closed contacts 315 and 316 of the synchronizing control relay 317 back to synchronizing relay 318 and battery. This circuit, therefore, establishes a holding circuit for synchronizing relay 318 as movable contact 325 is subsequently stepped from its "home" position thereby breaking the original battery circuit by removing the energizing source from the sensitive relay in synchronizing relay control network 314. It can be seen, therefore, that unless movable contact 325 is in the "home" position upon the receipt of a synchronizing pulse from the transmitter which, as has been explained before, is transmitted only while the movable contact 225 of the transmitter step relay is in the "home" position, synchronizing relay 318 would not be energized in that the connection between movable contact 325 and stationary contact R1 would not be established. If synchronizing relay 318 is not energized, its normally open contacts 323 and 324 do not establish a connection for transmitting the function signals from filter 351 to the movable contact 325 of step switch 300. Unless the respective step switches both start from this "home" position, function signals will not appear on movable contact 325, rendering the function signals ineffective to energize the working device 304.

The step signals which are transmitted with each operation of the transmitter step switch are impressed upon bus 349 through two-conductor telephone line 348 and conventional amplifier 347. These step signals are separated by filter 350 and are rejected by filters 302, 309 and 351. From filter 350, the step signal is impressed upon a step relay control network 331, which operates in the same manner and for the same reason as has previously been described in connection with latch relay control network 303. In this manner, local battery is picked up through the closed contacts of the sensitive relay in network 331 and is impressed across step relay 301 through contacts 330 and 329 of latch relay 336 which are now closed in that latch signals are energizing latch relay 336. In this manner, therefore, step switch 300 is simultaneously stepped with step switch 200 in the controlling station in that the transmitter step relay 201 transmits stepping pulses with each operation. As the step relay 201 of the transmitter successively steps its associated movable contacts away from the "home" position, the step relay 301 of step switch 300 in the receiver also successively steps its associated movable contacts 325 and 326 out from their "home" position in response to these step signals.

Function signals which have originated in the transmitter and which have been impressed upon the interconnecting line from the movable contact 225 of step relay 201 in the transmitter are also impressed upon bus 349 from two-conductor telephone line 348 through amplifier 347. These signals are separated by filter 351 and are rejected by filters 302, 309 and 350. The function signals are then conducted through closed contacts 323 and 324 of synchronizing relay 318 which is now energized in a manner as has been previously described, through line 332, and line 312 to movable contact 325. Assuming that the movable contact 225 of step switch 200, in the transmitter, is momentarily brushing stationary contact T19 of step relay 200, then movable contact 325 of step switch 300 is also brushing contact R19 of step switch 300 at the receiver as they are operating in synchronism. Therefore, the function signal which has been impressed on stationary contact T19 of the step switch 200 in the transmitter, as has previously been described, is impressed upon stationary contact R19 of step switch 300 in the receiver through movable contact 325 and, hence, upon delay network 335, which is shown in block form. Again one bank of stationary contacts on step switch 300 is utilized to receive function signals while the other bank of stationary contacts is used to transmit confirming or supervisory signals as will be later explained. Since the working device 304 is unable to descriminate between function signals and undesired random pulses, which may have components capable of passing through filter 351, this delay network has been provided for the purpose of rendering device 304 inoperative until a predetermined number of function signal pulses have been received. Through this scheme, the spurious operation of the working device 304 is prevented in the event of false pulses or transients which may appear on the interconnecting line and pass through filter 351.

The schematic circuit of an acceptable delay network which may be used with this application is outlined in Figure 5. In this figure, the working device is indicated at 304 with its "off" coil 363 and "on" coil 364. The associated stationary contacts of step switch 300 are shown at R–18 and R–19, respectively. Reference numeral 335 and 343 identify the respective "on" and "off" delay networks which are shown in block form in Figure 4. Although delay networks 335 and 343 are identical in their operation, both are detailed in Figure 5 for the purpose of clearly indicating the relationship they have with the associated working device 304 and stationary contacts R–18 and R–19. The circuit operation will be described, however, in regard to the "on" portion only. In the quiescent condition, tube 365 is non-conducting in that grid 366 is negatively biased below cutoff. Therefore, "on" coil 364, which is connected between B+ and the anode 367 of tube 365, is not energized. The same is true, of course, with "off" coil 363 and its associated delay network 343. The appearance of a function signal on stationary contact R–19, as it is brushed by movable contact 325 during the stepping sequence of step switch 300, appears as a long pulse across the primary 368 of the coupling transformer. The duration of this pulse is equal to the length of time during which movable contact 325 dwells on stationary contact R–19 before it is stepped to its next position. The presence of this function signal pulse across primary winding 368 produces a similar pulse across secondary winding 369 which, when rectified, charges a time constant circuit consisting of the parallel combination of resistor 371 and capacitor 372. To prevent this charge from leaking off at too great a rate and to provide a central voltage of proper polarity, diode 370 is employed. The function signals which are received at stationary contact R–19 as it is successively brushed by movable contact 325 with each stepping sequence of step switch 300, therefore, appear as successive long pulses on the time constant circuit, each adding to the charge thereon. When a sufficient charge has been established on the time constant circuit in this manner, the cutoff bias of grid 366 is overcome, thereby permitting tube 365 to conduct. As tube 365 conducts, the "on" operating coil of working device 304 is energized by the anode current which flows therethrough. By properly selecting the values of resistance and capacitance used in the time constant circuit, the delay network may be designed to be triggered to conduction upon the receipt of a predetermined number of function signal pulses. Since random pulses do not trigger the delay circuit, spurious operation of device 304 is prevented.

Assuming that delay network 335 requires three signal pulses to trigger it, as the movable contact brushes stationary contact R–19 on the third stepping sequence of step switch 300, the function signal received at stationary contact R–19 triggers delay network 335 which, in turn, energizes the "on" coil of working device 304. The energization of this coil moves swinging contacts 338 and 340 of the device 304 to their "on" position. As moving contact 338 swings to its "on" position, it establishes a connection with stationary contact 382, completing a circuit to master relay 353. The operation of master relay 353 will be explained later in this specification.

As swinging contact 340 of device 304 swings to its "on" position, it engages stationary contact 339 of device 304, completing a circuit from the supervision signal source 337 through line 354 to the "off" stationary contact T–18 of step switch 300. Supervision signal source 337 is here shown in block form as it may be of any conventional design. As the respective step relays continue operating through their stepping sequence, movable contact 326 brushes stationary contact T–18. This establishes a connection for the supervision signal generator 337 through line 344, the contacts 322 and 321 of synchronizing relay 318, which are now closed since synchronizing relay is still energized at this time, through amplifier 345 and line 346 to the two-conductor telephone line 348.

Returning now to Figure 3, the supervision signal from the receiver station is received on two-conductor telephone line 273 and is impressed upon movable contact 226 of step switch 200 through line 262, amplifier 263, filter 264, which is tuned to the supervision signal frequency, and line 265. The next time movable contact 226 brushes stationary contact R–18, the supervision signal is impressed upon delay network 267 through line 266. Delay network 267 may be identical to delay network 335, both in form and operation, which has previously been explained. Assuming again that three pulses are necessary to trigger delay network 267, the third time movable contact 226 brushes stationary contact R–18, delay network 267 will be triggered, thereby energizing the "on" coil 270 of auxiliary relay 204 through line 269. As the "on" coil of auxiliary relay 204 is energized, its swinging arms 218 and 273 are pulled into their "on" positions. In this position, battery is placed across the "on" indicating light through movable contact 273 and stationary contact 274 of auxiliary relay 204, thereby illuminating "on" indicating light 271 which confirms that the "on" function has been received and performed at the controlled station. As the auxiliary relay's movable contact 218 is swung to its "on" position, the holding circuit across control relay 208, as has been previously described, is broken, allowing control relay to de-energize and drop out. As this relay drops out, battery is removed from the latch relay 236 and step relay 201 of step switch 200, through the opening of contacts 221 and 222. This, of course, shuts down the transmitter stepping sequence and, as a consequence, the receiver stepping sequence in that the receiver is dependent upon the transmitter for its motivating pulses. The battery across alarm light 242 is also removed through the opening of contacts 239 and 240, thereby affording a visual indication that the selected functions have been received and performed at the receiver station.

Referring again to Figure 4, the contacts of master relay 353 are indicated as being in their open position. This relay is of a mechanical latching type in which the movable contacts remain in their last energized position, and must be positively moved to the other position through the energization of the opposite coil. In this instance, all of the working devices such as 304 which have been energized to their "on" positions, have closed their "on" contacts. However, the respective circuits remain open in the master relay. So that all of the associated controlled equipment may be turned on simultaneously, this master relay is provided. Upon completion of the sending of the "on" and "off" functions and the receipt of confirming information that the functions have been performed by the working devices, the system shuts down as has been described before. In this condition, all of the "on" functions may be transmitted from the working devices to the associated equipment simultaneously through the master relay contacts by actuating the momentary contact master "on" button number 276 which establishes contact with stationary contact 277. This completes a circuit from the step signal source 256, through line 278, through contacts 276 and 277, and through line 279 to amplifier 250 from which it is impressed upon telephone line 273. This signal is received at the receiver from telephone line 348 and is impressed upon bus 349 through amplifier 347. From bus 349, the signal is separated by filter 350 and operates the sensitive relay in step relay control network 331 in a manner as has been previously described. The energization of the relay in network 331 places battery voltage upon the "on" coil 384 of master relay 353 through the normally closed contacts 327 and 328, line 355, line 356 and line 357 to coil 384. The energization of this coil, therefore, closes its contacts 358, 359, 360 and 361. The closure of these contacts establishes an "on" circuit to the associated equipment which has been previously selected to have been turned on.

In the event it is desirable to reset the equipmnt or to turn it all off simultaneously, this may be done through the operation of momentary contact stop button 280. As button 280 is depressed, a circuit is completed from the synchronizing signal generator 248 through line 282, contacts 280 and 281 of the master "off" button and line 279 to amplifier 250 from which it is impressed upon telephone line 273. This signal is received and impressed upon bus 349 in a manner as described before. The signal is separated through filter 309 from which it operates master relay control network 362 in a manner as has been previously described except that a capacitor-resistor network is included to introduce relay time delay. The operation of the relay in this control network establishes a battery circuit across the "off" coil 383 of master relay 353. As the energization of this coil moves the associated contacts to their "off" position, the circuits to all controlled equipment are interrupted.

From this description, it may be seen that a plurality of units of equipment may be remotely controlled over a narrow pass band communications line in that only five different frequencies have been used. A pair of step switches of the type having two electrically independent movable contacts which may be successively stepped across a series of stationary contacts, certain of which are in cooperative relation with one movable contact while the remainder are in cooperative relationship with the other movable contact, is employed, one in each the controlling and the controlled station. To successively step these switches, each is provided with a step relay and, to hold the movable contacts in each position until stepped to the next position, a latch relay. The movable contacts of the step switches are connected to each other through a communications line which electrically interconnects the controlling and controlled stations. By transmitting a continuous latch signal and a pulsed step signal, each of a characteristic distinctive frequency, with every step of the controlling station step switch from the controlling to the controlled station, the two step switches may be synchronized for simultaneous operation. To operate a series of working devices at the controlled station, a function signal, characterized by a third distinctive frequency, is generated at the controlling station. This source of function signals is connected to the stationary contacts of the controlling station step switch while the working devices are conneced to corresponding stationary contacts of the controlled station step switch. In this manner, the working devices may be connected to, and energized by, the function signals originating at the controlled station through the corresponding stationary contacts of each step switch and the respective interconnected, synchronized movable contacts. To render the function signals ineffective to operate the controlled station working devices, a synchronizing signal, characterized by a fourth distinctive frequency, is generated at the controlling station and is transmitted through the interconnecting line to operate a synchronizing relay at the controlled station, only while the respective movable contacts are in the start position. A supervision signal source, characterized by another distinctive frequency, is connected to the transmit stationary contacts of the controlled station step switch while indicating lights are connected through auxiliary relays to the received stationary contacts of the controlling station step switch. As a control function has been received and performed, the supervision signal illuminates the indicating lamp at the controlling station, confirming the transmitted information has been received. While this system affords a remote control of many units of equipment through the use of only five different frequencies for function signals, stepping pulses, latch signals, synchronizing signals and supervision signals, the length of time required to effect a complete sequence of controls requires a longer period of time than with the tone basis system. Through the sacrifice of a short period of time in favor of a narrow transmission band, therefore, a nearly unlimited number of control functions may be remotely performed through the use of a minimum of different frequencies.

While we have shown and described a preferred embodiment of our invention, it will be obvious to those skilled in the art that various modifications and substitutions may be made without departing from the spirit of this invention which is to be limited only within the scope of the appended claims.

What is claimed is:

1. A remote supervisory control system comprising, a controlling station, a controlled station, working devices at said controlled station, a first switch having stationary and movable contacts at said controlling station, a second switch having stationary and movable contacts at said controlled station, device operating means for said working devices, means for electrically interconnecting said controlling and controlled stations, means for connecting the movable contacts of said first and second switches to each other through said interconnecting means, means for connecting said device operating means to the stationary contacts of said first switch, means for connecting said working devices to the stationary contacts of said second switch and means for synchronizing the simultaneous operation of said first and second switches.

2. A remote supervisory control system comprising, a controlling station, a controlled station, working devices at said controlled station, a first switch having stationary and movable contacts at said controlling station, a second switch having stationary and movable contacts at said controlled station, device operating means at said controlling station for said working devices, means for electrically interconnecting said controlling and controlled stations, means for connecting the movable contacts of said first and second switches to each other through said interconnecting means, means for selectively connecting said device operating means to the stationary contacts of said first switch, means for connecting said working devices to the stationary contacts of said second switch and means for synchronizing the simultaneous operation of said first and second switches.

3. A remote supervisory control system comprising, a controlling station, a controlled station, working devices at said controlled station, a first switch having stationary and movable contacts at said controlling station, a second switch having stationary and movable contacts at said controlled station, a function signal source at said controlling station for operating said working devices, means for electrically interconnecting said controlling and controlled stations, means for connecting the movable contacts of said first and second switches to each other through said interconnecting means, means for connecting said function signal source to the stationary contacts of said first switch, means for connecting said working devices to the stationary contacts of said second switch and means for synchronizing the simultaneous operation of said first and second switches.

4. A remote supervisory control system comprising, a controlling station, a controlled station, working devices at said controlled station, a first switch having stationary and movable contacts at said controlling station, a second switch having stationary and movable contacts at said controlled station, a function signal source at said controlling station for operating said working devices, means for electrically interconnecting said controlling and controlled stations, means for connecting the movable contacts of said first and second switches to each other through said interconnecting means, means for selectively connecting said function signal source to the stationary contacts of said first switch, means for connecting said working devices to the stationary contacts of said second switch and means for synchronizing the simultaneous operation of said first and second switches.

5. A remote supervisory control system comprising, a controlling station, a controlled station, working devices at said controlled station, a first step switch having stationary and movable contacts at said controlling station, a second step switch having stationary and movable contacts at said controlled station, a function signal source at said controlling station for operating said working devices, means for electrically interconnecting said controlling and controlled stations, means for connecting the movable contacts of said first and second step switches to each other through said interconnecting means, means for connecting said function signal source to the stationary contacts of said first switch, means for connecting said working devices to the stationary contacts of said second switch and means for synchronizing the simultaneous operation of said first and second switches.

6. A remote supervisory control system comprising, a controlling station, a controlled station, working devices at said controlled station, a first step switch having stationary and movable contacts at said controlling station, a second step switch having stationary and movable contacts at said controlled station, a function signal source at said controlling station for operating said working devices, means for electrically interconnecting said controlling and controlled stations, means for connecting the movable contacts at said first and second step switches to each other through said interconnecting means, means for selectively connecting said function signal source to the stationary contacts of said first switch, means for connecting said working devices to the stationary contacts of said second switch and means for synchronizing the simultaneous operation of said first and second switches.

7. A remote supervisory control system, comprising, a controlling station, a controlled station, working devices at said controlled station, means for electrically interconnecting said controlling and controlled stations, a first step switch having stationary and movable contacts at said controlling station, a second step switch having stationary and movable contacts at said controlled station, device operating means for said working devices, means for connecting the movable contacts of said first and second step switches to each other through said interconnecting means, means for connecting said device operating means to the stationary contacts of said first step switch, means for connecting said working devices to the stationary contacts of said second step switch, means for stepping said first step switch, means for simultaneously stepping said second step switch and means for rendering said device operating means ineffective unless the movable contacts of the respective step switches are at their respective start positions with the beginning of each step sequence.

8. A remote supervisory control system comprising, a controlling station, a controlled station, working devices at said controlled station, means for electrically interconnecting said controlling and controlled stations, a first step switch having stationary and movable contacts at said controlling station, a second step switch having stationary and movable contacts at said controlled station, device operating means for said working devices, means for connecting the movable contacts of said first and second step switches to each other through said interconnecting means, means for selectively connecting said device operating means to the stationary contacts of said first step switch, means for connecting said working devices to the stationary contacts of said second step switch, means for stepping said first step switch, means for simultaneously stepping said second step switch and means for rendering said device operating means ineffective unless the movable contacts of the respective step switches are at their respective start positions with the beginning of each step sequence.

9. A remote supervisory control system comprising, a controlling station, a controlled station, working devices at said controlled station, means for electrically interconnecting said controlling and controlled stations, a first step switch having stationary and movable contacts at said controlling station, a second step switch having stationary and movable contacts at said controlled station, a function signal source at said controlling station for operating said working devices, means for connecting the movable contacts of said first and second step switches to each other through said interconnecting means, means for connecting said function signal source to the stationary contacts of said first step switch, means for connecting said working devices to the stationary contacts of said second step switch, means for stepping said first step switch, means for simultaneously stepping said second step switch and means for rendering said function signal ineffective unless the movable contacts of the respective step switches are at their respective start positions with the beginning of each step sequence.

10. A remote supervisory control system comprising, a controlling station, a controlled station, working devices at said controlled station, means for electrically interconnecting said controlling and controlled stations, a first step switch having stationary and movable contacts at said controlling station, a second step switch having stationary and movable contacts at said controlled station, device operating means for said working devices, means for connecting the movable contacts of said first and second step switches to each other through said interconnecting means, means for connecting said device operating means to the stationary contacts of said first step switch, means for connecting said working devices to the stationary contacts of said second step switch, means for operating said first step switch through a stepping sequence, means for simultaneously operating said second step switch through a stepping sequence, means for restraining said movable contacts of said step switches from returning to their respective start positions until the completion of said stepping sequences, and means for rendering said device operating means ineffective unless the movable contacts of the said respective step switches are at their respective start positions with the beginning of each step sequence.

11. A remote supervisory control system comprising, a controlling station, a controlled station, working devices at said controlled station, means for electrically interconnecting said controlling and controlled stations, a first step switch having stationary and movable contacts at said controlling station, a second step switch having stationary and movable contacts at said controlled station, a function signal source at said controlling station for operating said working devices, means for connecting the movable contacts of said first and second step switches to each other through said interconnecting means, means for connecting said function signal source to the stationary contacts of said first step switch, means for connecting said working devices to the stationary contacts of said second step switch, means for operating said first step switch through a stepping sequence, means for simultaneously operating said second step switch through a stepping sequence, means for preventing said movable contacts of said step switches from returning to their respective start positions until the completion of said stepping sequences, and means for rendering said function signal ineffective unless the movable contacts of the said respective step switches are at their respective start positions with the beginning of each step sequence.

12. A remote supervisory control system comprising, a controlling station, a controlled station, working devices at said controlled station, means for electrically interconnecting said controlling and controlled stations, a first step switch having stationary and movable contacts at said controlling station, a second step switch having stationary and movable contacts at said controlled station, a function signal source at said controlling station for operating said working devices, means for connecting the movable contacts of said first and second step switches to each other through said interconnecting means, means for selectively connecting said function signal source to the stationary contacts of said first step switch, means for connecting said working devices to the stationary contacts of said second step switch, means for operating said first step switch through a stepping sequence, means for simultaneously operating said second step switch through a stepping sequence, means for preventing said movable contacts of said step switches from returning to their respective start positions until the completion of said stepping sequences, and means for rendering said function signal ineffective unless the movable contacts of the said respective step switches are at their respective start positions with the beginning of each step sequence.

13. A remote supervisory control system comprising, a controlling station, auxiliary relays at said controlling station, a controlled station, working devices at said controlled station, a first step switch having a plurality of stationary contacts and first and second movable contacts each in cooperative relation with certain of said stationary contacts at said controlling station, a second step switch having a plurality of stationary contacts and first and second movable contacts each in cooperative relation with certain of said stationary contacts at said controlled station, means for electrically interconnecting said controlling and controlled stations, means for connecting said movable contacts of said first and second step switches to each other through said interconnecting means, device operating means for said working devices, relay operating means for said auxiliary relays, means for connecting said device operating means to said stationary contacts which are in cooperative relation with said second movable contact of said first step switch, means for connecting said auxiliary relays to said stationary contacts which are in cooperative relation with said first movable contact of said first step switch, means for connecting said working devices to said stationary contacts which are in cooperative relation with said second movable contact with said second step switch, means for connecting said relay operating means to said stationary contacts which are in cooperative relation with said first movable contact of said second step switch, means for stepping said first and second step switches simultaneously, and means for rendering said device operating means ineffective unless the movable contacts of the respective step switches are at their respective start positions with the beginning of each step sequence.

14. A remote supervisory control system comprising, a controlling station, auxiliary relays at said controlling station, a controlled station, working devices at said controlled station, a first step switch having a plurality of stationary contacts and first and second movable contacts each in cooperative relation with certain of stationary contacts at said controlling station, a second step switch having a plurality of stationary contacts and first and second movable contacts each in cooperative relation with certain of said stationary contacts at said controlled station, means for electrically interconnecting said controlling and controlled stations, means for connecting said movable contacts of said first and second step switches to each other through said interconnecting means, device operating means for said working devices, relay operating means station for said auxiliary relays, means for selectively connecting said device operating means to said stationary contacts which are in cooperative relation with said second movable contact of said first step switch, means for connecting said auxiliary relays to said stationary contacts which are in cooperative relation with said first movable contact of said first step switch, means for connecting said working devices to said stationary contacts which are in cooperative relation with said second movable contact of said second step switch, means for connecting said relay operating means to said stationary contacts which are in cooperative relation with said first movable contact of said second step switch, means for stepping said first and second step switches simultaneously, and means for rendering said device operating means ineffective unless the movable contacts of the respective step switches are at their respective start positions with the beginning of each step sequence.

15. A remote supervisory control system comprising, a controlling station, auxiliary relays at said controlling station, a controlled station, working devices at said controlled station, a first step switch having a plurality of stationary contacts and first and second movable contacts each in cooperative relation with certain of said stationary contacts at said controlling station, a second step switch having a plurality of stationary contacts and first and second movable contacts each in cooperative relation with certain of said stationary contacts at said controlled station, means for electrically interconnecting said controlling and controlled stations, means for connecting said movable contacts of said first and second step switches to each other through said interconnecting means, a function signal source at said controlling station for operating said working devices, a supervision signal source at said controlled station for operating said auxiliary relays, means for connecting said function signal source to said stationary contacts which are in cooperative relation with said second movable contact of said first step switch, means for connecting said auxiliary relays to said stationary contacts which are in cooperative relation with said first movable contact of said first step switch, means for connecting said working devices to said stationary contacts which are in cooperative relation with said second movable contact of said second step switch, means for connecting said supervision signal source to said stationary contacts which are in cooperative relation with said first movable contact of said second step switch, means for stepping said first and second step switches simultaneously, and means for rendering said function signals ineffective unless the movable contacts of the respective step switches are at their respective start positions with the beginning of each step sequence.

16. A remote supervisory control system comprising, a controlling station, a controlled station, working devices at said controlled station, device operating means for said working devices, means for electrically interconnecting said controlling and controlled stations, a first step switch having stationary and movable contacts at said controlling station, a second step switch having stationary and movable contacts at said controlled station, means for connecting the movable contacts of said first and second step switches to each other through said interconnecting means, means for connecting said device operating means to the stationary contacts of said first step switch, means for connecting said working devices to the stationary contacts of said second step switch, means for operating said first step switch through a stepping sequence, means for simultaneously operating said second step switch through a stepping sequence, restraining means for preventing said movable contacts of said step switches from returning to their respective start positions until the completion of said stepping sequence, means at said controlling station for operating said restraining means at said controlled station, and means for rendering said device operating means ineffective unless the movable contacts of the said respective step switches are at their respective start positions with the beginning of each step sequence.

17. A remote supervisory control system comprising, a controlling station, a controlled station, working devices at said controlled station, a function signal source at said controlling station for operating said working devices, means for electrically interconnecting said controlling and controlled stations, a first step switch having stationary and movable contacts at said controlling station, a second step switch having stationary and movable contacts at said controlled station, means for connecting the movable contacts of said first and second step switches to each other through said interconnecting means, means for connecting said function signal source to the stationary contacts of said first step switch, means for connecting said working devices to the stationary contacts of said second step switch, means for operating said first step switch through a stepping sequence, means for operating said second step switch through a stepping sequence, latch means for preventing said movable contacts of said step switches from returning to their respective start positions until the completion of said stepping sequence, a latch signal source at said controlling station for operating said latch means at said controlled station, and means for rendering said function signals ineffective unless the movable contacts of the said respective step switches are at their respective start positions with the beginning of each step sequence.

18. A remote supervisory control system comprising, a controlling station, a controlled station, working devices at said controlled station, a function signal source at said controlling station for operating said working devices, means for electrically interconnecting said controlling and controlled stations, a first step switch having stationary and movable contacts at said controlling station, a second step switch having stationary and movable contacts at said controlled station, means for connecting the movable contacts of said first and second step switches to each other through said interconnecting means, means for selectively connecting said function signal source to the stationary contacts of said first step switch, means for connecting said working devices to the stationary contacts of said second step switch, means for operating said first step switch through a stepping sequence, means for operating said second step switch through a stepping sequence, latch means for preventing said movable contacts of said step switches from returning to their respective start positions until the completion of said stepping sequence, a latch signal source at said controlling station for operating said latch means at said controlled station, and means for rendering said function signals ineffective unless the movable contacts of the said respective step switches are at their respective start positions with the beginning of each step sequence.

19. A remote supervisory control system comprising, a controlling station, auxiliary relays at said controlling station, a controlled station, working devices at said controlled station, a first step switch having a plurality of stationary contacts and first and second movable contacts each in cooperative relation with certain of said stationary contacts at said controlling station, a second step switch having a plurality of stationary contacts and first and second movable contacts each in cooperative relation with certain of said stationary contacts at said controlled station, means for electrically interconnecting said controlling and controlled stations, means for connecting said movable contacts of said first and second step switches to each other through said interconnecting means, means for operating said working devices, means for operating said auxiliary relays, means for connecting said working devices operating means to said stationary contacts which are in cooperative relation with said second movable contact of said first step switch, means for connecting said auxiliary relays to said stationary contacts which are in cooperative relation with said first movable contact of said first step switch, means for connecting said working devices to said stationary contacts which are in cooperative relation with said second movable contact of said second step switch, means for connecting said auxiliary relays operating means to said stationary contacts which are in cooperative relation with said first movable contact of said second step switch, means for simultaneously stepping said first and second step switches through a stepping sequence, means for restraining said movable contacts of said step switches from returning to their respective start positions until the completion of said stepping sequence, means at said controlling station for operating said restraining means at said controlled station, and means for rendering said working devices operating means ineffective unless the movable contacts of the respective step switches are at their respective start positions with the beginning of each step sequence.

20. A remote supervisory control system comprising, a controlling station, auxiliary relays at said controlling station, a controlled station, working devices at said controlled station, a first step switch having a plurality of stationary contacts and first and second movable contacts each in cooperative relation with certain of said stationary contacts at said controlling station, a second step switch having a plurality of stationary contacts and first and second movable contacts each in cooperative relation with certain of said stationary contacts at said controlled station, means for electrically interconnecting said controlling and controlled stations, means for connecting said movable contacts of said first and second step switches to each other through said interconnecting means, means for operating said working devices, means for operating said auxiliary relays, means for selectively connecting said working devices operating means to said stationary contacts which are in cooperative relation with said second movable contact of said first step switch, means for connecting said auxiliary relays to said stationary contacts which are in cooperative relation with said first movable contact of said first step switch, means for connecting said working devices to said stationary contacts which are in cooperative relation with said second movable contact of said second step switch, means for connecting said auxiliary relays operating means to said stationary contacts which are in cooperative relation with said first movable contact of said second step switch, means for simultaneously stepping said first and second step switches through a stepping sequence, means for restraining said movable contacts of said step switches from returning to their respective start positions until the completion of said stepping sequence, means at said controlling station for operating said restraining means at said controlled station, and means for rendering said working devices operating means ineffective unless the movable contacts of the respective step switches are at their respective start positions with the beginning of each step sequence.

References Cited in the file of this patent

UNITED STATES PATENTS 1,824,828 Maurer ---------------- Sept. 29, 1931
1,844,558 Boder ----------------- Feb. 2, 1932